No. 654,101.   
E. W. McCASLIN.  
PNEUMATIC TIRED WHEEL.  
(Application filed June 6, 1900.)  
(No Model.)  
Patented July 17, 1900.

Witnesses:  
A. F. Durand  
A. G. Oliver

Inventor:  
Elton W. McCaslin  
by Chas. E. Page Atty

UNITED STATES PATENT OFFICE.

ELTON W. McCASLIN, OF CHICAGO, ILLINOIS, ASSIGNOR TO THE MORGAN & WRIGHT, OF SAME PLACE.

PNEUMATIC-TIRED WHEEL.

SPECIFICATION forming part of Letters Patent No. 654,101, dated July 17, 1900.

Application filed June 6, 1900. Serial No. 19,249. (No model.)

*To all whom it may concern:*

Be it known that I, ELTON W. MCCASLIN, a citizen of the United States, residing at Chicago, in the county of Cook and State of Illinois, have invented a certain new and useful Improvement in Pneumatic-Tired Wheel-Rims, of which the following is a specification.

Objects of my invention are to provide pneumatic-tired wheel-rims more particularly adapted to withstand the strains and heavy usage incident to use on the wheels of automobiles and heavy vehicles and at the same time to permit the tire to be readily removed and repaired when necessary, to securely and uniformly attach the tire to the rim, to prevent lateral rolling of the tire upon the rim, and to provide certain improved features of construction and arrangement.

To the attainment of the foregoing and other useful ends my invention consists in matters hereinafter set forth.

Figure 1:
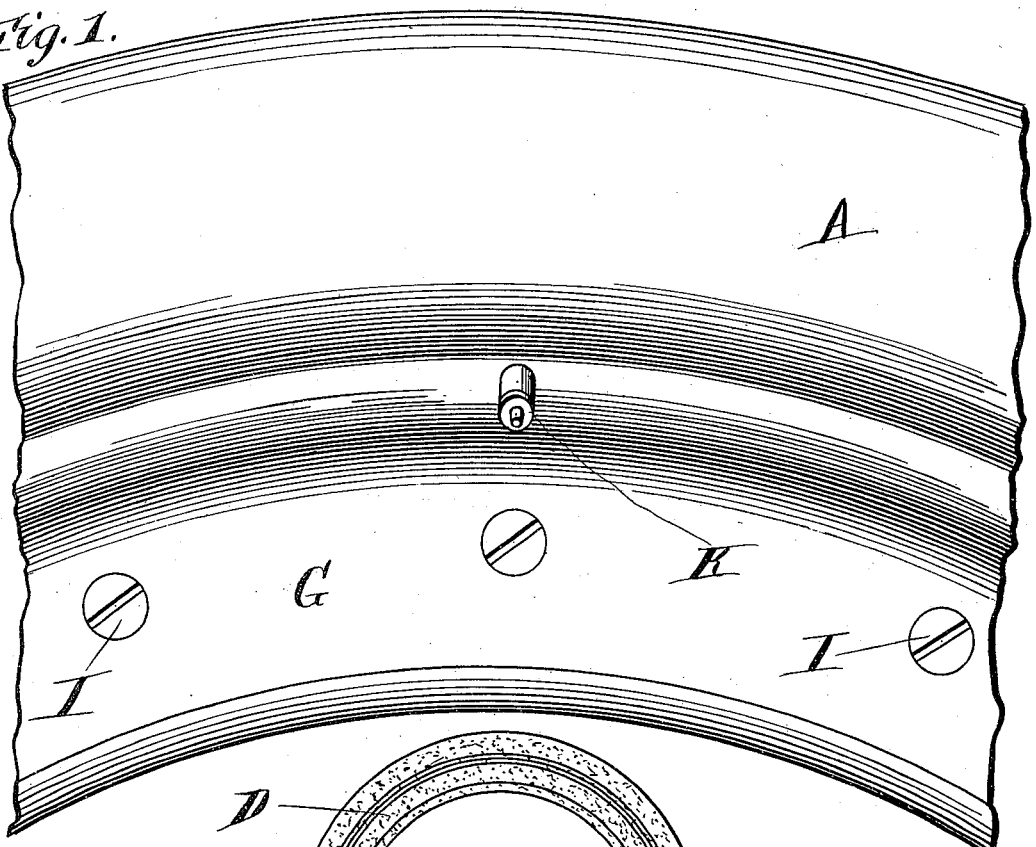
Figure 2:
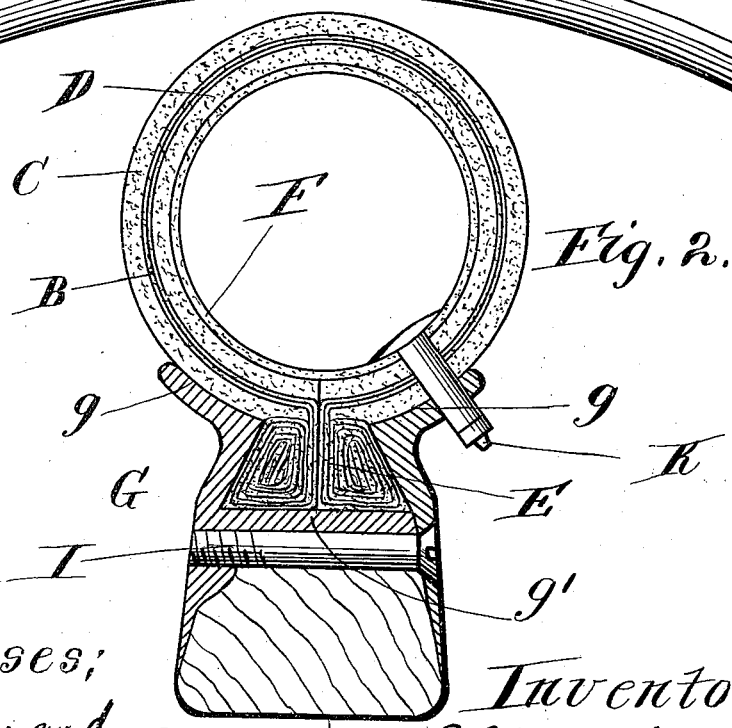

In the accompanying drawings, Figure 1 shows in side elevation a portion of the rim and tire. Fig. 2 is a section taken transversely through Fig. 1.

The pneumatic tire is of the double-tube type—that is to say, it comprises an outer casing and an inner inflatable air-tube. The casing A of the tire is preferably molded by what is known as the "blown" process, which involves first the building up of the casing and next the expansion of a liquid or fluid, such as air or gas, within the casing, while the latter is confined within a suitable mold, as will be readily understood by those skilled in the art. The casing is essentially composed of rubber or rubber composition and fabric, the latter being in one or more plies or layers B. When the casing is molded by the blown process in place of being molded upon a mandrel, the fabric B will lie between an outer and inner layer C and D of rubber; but should it be desired to mold the casing upon a mandrel according to the Morgan & Wright process then the inner layer D of rubber may be omitted. In either case, however, the fabric becomes united with and practically inclosed in the casing. The casing A is molded with a dovetail or flaring base-rib E, mainly composed of textile material with a suitable quantity of vulcanizable adherent—such, for example, as "friction-duck," consisting of duck or canvas treated with raw rubber. A portion of the fabric of the dovetailed or flaring base extends up within the structure which forms the hollow casing A—as, for example, the fabric layer or layers B may be of such width as to extend into the base-rib E and form all or a part thereof, the latter condition rendering it desirable to further build up the base-rib by additional plies or pieces of fabric. Where the hollow casing A is molded by the blown process, the compression of the material thereof against the inner wall of the annular mold-chamber will be effected by the internal pressure of an expanding fluid or liquid. The base-rib, however, will in such case, as well as where the casing is molded on a mandrel, be laterally compressed to form a well-compacted hard body by the side walls of a dovetail annular mold-channel, which opens into the annular transversely-cylindric mold-chamber and which is formed by suitable offsets in the parts of the mold. The casing with such rib is suitably vulcanized, and after vulcanization the whole comprises a flexible elastic pneumatic tire-casing having along its base a dovetail rib substantially of compressed fabric. The casing is then opened along its base by longitudinally splitting or dividing the annular rib of compressed fabric, after which an inflatable inner rubber tube F can be introduced. The ends of this inflatable inner tube can be closed and lapped or brought together in any suitable way, or such tube can be telescoped at its edges, as may be preferred. The tire thus constructed is combined with and held in place upon any desired or suitable construction of wheel by means of a longitudinally-divided clamping-rim G, adapted to form a dovetail channel for the dovetail or inwardly-flaring base-rib of the casing and provided with tightening-bolts by which its parts can be drawn together against the beveled sides of the dovetail base-rib of the casing. The clamping-rim thus constructed is also provided with annular transversely-recessed or concave seats $g$ for supporting base portions of the casing at opposite sides of the base-rib. This two-part clamping-rim may form the wheel-felly proper or it may serve as a felly-band or as a supplemental felly-band on a wooden felly H, the arrangement shown being a two-part rim with one part having an annular flange g', which encircles the felly H. In such case the other part of the rim is in the nature of an annular clamp-plate having one of the seats g along its outer marginal portion. The two parts of the clamping-rim are drawn and held together by bolts I, which preferably pass through the felly H, so as to firmly hold the rim in place, it being observed that each part of the two-part rim has an inner flange or marginal portion arranged to clamp against the felly. The inner inflatable tube is provided with a suitable valved inflating-nipple K, which latter may either extend through a suitable bore in the base-rib of the casing and annular base-flange g' of the rim or the valved nipple may extend through an opening in the casing at one side of the base-rib and thence extend out through one of the seat portions g of the two-part rim.

With the foregoing construction I can provide a pneumatic tire suitable for automobiles and heavy vehicles and having strong, hard, and practically unyielding and non-extensible achoring-base suitably stiff to hold down the tire and adapted to be firmly and rigidly clamped by the two-part rim. I also firmly unite this base-rib with the casing or the body of the tire, so as to prevent the same from being torn away from the base-rib which is rigidly clamped by the rim, it being seen that this dovetail base-rib is practically a solid body of compressed fabric having a portion or portions of its material anchored to the outer casing or tire-tube C; also, that when desired the two-part rim can be readily opened and the tire removed and opened along its split base. The seats g prevent the tire from rolling and coöperate with the base-rib in providing a broad base-support for the tire.

What I claim as my invention is—

A pneumatic-tired wheel-rim, comprising a longitudinally-divided rim forming clamping members and provided with tie and clamping bolts, and adapted when assembled to form an annular dovetail or inwardly and laterally flaring channel with annular transversely concaved or recessed tire-seats respectively at opposite sides of such channel, and a pneumatic tire comprising an inner inflatable air-tube and an outer longitudinally-divided casing seated upon the seats at opposite sides of the rim-channel and having a substantially non-extensible, longitudinally split or divided dovetail or laterally-flaring base-rib essentially composed of fabric molded and compacted into said form and having portions of its fabric material extending into and anchored to the casing, said longitudinally-divided rib being fitted and clamped within the dovetail or inwardly-flaring channel of the rim.

ELTON W. McCASLIN.

Witnesses:
JOHN H. WINSLOW,
J. H. MILLER.